United States Patent
Sugiyama

(10) Patent No.: US 7,447,264 B2
(45) Date of Patent: Nov. 4, 2008

(54) MOVING-PICTURE TEMPORAL SCALABLE CODING METHOD, CODING APPARATUS, DECODING METHOD, DECODING APPARATUS, AND COMPUTER PROGRAM THEREFOR

(75) Inventor: Kenji Sugiyama, Yokosuka (JP)

(73) Assignee: Victor Company of Japan, Ltd., Yokohama-Shi, Kanagawa-Ken (JP)

(*) Notice: Subject to any disclaimer, the term of this patent is extended or adjusted under 35 U.S.C. 154(b) by 792 days.

(21) Appl. No.: 10/693,942

(22) Filed: Oct. 28, 2003

(65) Prior Publication Data
US 2004/0101049 A1 May 27, 2004

(30) Foreign Application Priority Data
Nov. 7, 2002 (JP) ............................. 2002-323377

(51) Int. Cl.
*H04N 7/18* (2006.01)
(52) U.S. Cl. .............................. 375/240.13; 375/240.12; 375/240.14
(58) Field of Classification Search ................................. 375/240.01–240.29
See application file for complete search history.

(56) References Cited

U.S. PATENT DOCUMENTS

| 5,742,343 A | * 4/1998 | Haskell et al. | 375/240.15 |
| 6,188,725 B1 | 2/2001 | Sugiyama | 375/240 |
| 6,728,317 B1 | * 4/2004 | Demos | 375/240.21 |
| 7,068,717 B2 | * 6/2006 | Van Der Schaar | 375/240.02 |

* cited by examiner

*Primary Examiner*—Andy S Rao
(74) *Attorney, Agent, or Firm*—Jacobson Holman PLLC

(57) ABSTRACT

In temporal scalable moving-picture video signal coding, an input interlaced moving-picture video signal is converted into a progressive moving-picture video signal at the same frame rate as the interlaced moving-picture video signal. The progressive moving-picture video signal is coded to produce a first bitstream. Fields of the interlaced moving-picture video signal are coded with inter-picture prediction using a locally decoded picture signal as a reference video signal, thus producing a second bitstream. The fields are different in time from frames of the progressive moving-picture video signal. The locally decoded picture signal are produced by locally decoding the progressive moving-picture video signal. The first and second bitstreams are multiplexed into an output temporal scalable moving-picture video bitstream.

8 Claims, 7 Drawing Sheets

| field0 | field2 | field1 | field4 | field3 | field6 | field5 | field8 | field7 |

| Prog.0 | Prog.2 | field1 | Prog.4 | field3 | Prog.6 | field5 | Prog.8 | field7 |

| field0 | field2 | field1 | field4 | field3 | field6 | field5 | field8 | field7 |

| Prog.0 | Prog.2 | field1 | Prog.4 | field3 | Prog.6 | field5 | Prog.8 | field7 |

| Prog.0 | Prog.2 | Prog.4 | Prog.6 | Prog.8 |

| field1 | field3 | field5 | field7 | field9 |

MOVING-PICTURE TEMPORAL SCALABLE CODING METHOD, CODING APPARATUS, DECODING METHOD, DECODING APPARATUS, AND COMPUTER PROGRAM THEREFOR

BACKGROUND OF THE INVENTION

The present invention relates to a moving-picture temporal scalable coding method and a moving-picture temporal scalable coding apparatus, a moving-picture temporal scalable decoding method and a moving-picture temporal scalable decoding apparatus, and also a computer program for performing the coding or the decoding method.

Moving-picture coding is classified into simple one-layer coding and scalable coding for encoding two-layer bitstreams. The latter allows decoding a bitstream of a base layer only and also decoding a bitstream of an enhancement layer, decoded base-layer and enhancement-layer pictures being combined to reproduce high-quality pictures.

Scalable coding is classified into SNR (Signal-to-Noise Ratio), spatial, and temporal scalable coding. The temporal scalable coding is to decimate, for example, a 60-fps (field per second) interlaced image per field to obtain a 30-fps image and encode this 30-fps image while predicting the remaining non-encoded fields by using a locally decoded image of the encoded fields and encode prediction residuals.

In known moving-picture temporal scalable coding, a 60-fps interlaced moving-picture video signal is divided into even-number fields and odd-number fields.

The even-number fields are subjected to coding while the odd-number fields are subjected to delay.

In coding, a video signal carrying 30-fps even-number fields is coded into a bitstream and quantization resultants (not a bitstream but signal components at least quantized). The coding technique may be MPEG inter-picture predictive coding or intrafield coding.

The quantization resultants are subjected to local decoding to be reproduced into a local decoded picture. The local picture is subjected to inter-picture prediction to produce a predictive signal for each odd-number field.

In delaying, each odd-number field is delayed until the predictive signal is produced based on each even-number field, as explained above.

The predictive signal is subtracted from an odd-number-field delayed signal to obtain a prediction residual.

The prediction residual is subjected to DCT (Discrete Cosine Transform). The resultant 8×8 DCT coefficients are subjected to quantization at a given step width. The resultant fixed-length coefficients (prediction residual) are subjected to variable-length coding to obtain a bitstream.

This bitstream is multiplexed with the bitstream already obtained from the even-number fields, as an output moving-picture bitstream under temporal scalable coding.

In summary, under the known temporal scalable coding, an interlaced moving-picture video signal is divided into even-number fields and odd-number fields. The even-number fields are converted into a base-layer bitstream while the odd-number fields an enhancement-layer bitstream, or vice versa.

The base-layer bitstream and the enhancement-layer bitstream are multiplexed with each other to form an output moving-picture bitstream under temporal scalable coding, as illustrated in FIG. 1.

In FIG. 1, a sign "field" indicates one field of an interlaced video. The numbers attached to the signs "field" indicate the order of coded pictures. Base-layer pictures come before enhancement-layer pictures for bi-directional prediction of the enhancement-layer pictures, even though the former pictures come after the latter pictures in the time domain. The reverse order is further required among the base-layer pictures when bi-directional prediction is performed for these pictures.

In known moving-picture temporal scalable decoding, a moving-picture bitstream obtained from a 60-fps interlaced moving-picture video signal by temporal scalable coding, is divided into a base-layer bitstream, an enhancement-layer bitstream, and a scale factor.

The base-layer bitstream is decoded so that a 30-fps video signal is reproduced. The reproduced signal carries even-number fields of the 60-fps interlaced moving-picture video signal. The reproduced signal is subjected to inter-picture prediction to produce a prediction signal for odd-number fields of the interlaced moving-picture video signal.

The enhancement-layer bitstream is subjected to variable-length decoding so that variable-length codes of prediction residual is reconverted into fixed-length codes.

The fixed-length codes are subjected to dequantization at a given quantization parameter to be reproduced into DCT coefficients of prediction residual.

The DCT coefficients are subjected to inverse DCT so that 8×8 DCT coefficients are converted into a decoded prediction-residual signal.

The decoded prediction-residual signal is added to the prediction signal already produced to form a 30-fps decoded video signal. This decoded signal carries the odd-number fields of the 60-fps interlaced moving-picture video signal.

The odd-number fields of the 30-fps decoded video signal and the even-number fields of the 30-fps video signal are selected in synchronism with the scale factor. The latter video signal carrying the even-number fields have already been decoded and delayed until the former video signal is decoded.

The odd-/even number field selection reproduces the 60-fps interlaced moving-picture video signal.

As explained, under the known temporal scalable coding, an interlaced moving-picture video signal is divided into even-number fields and odd-number fields. The even-number fields are converted into base-layer bitstream while the odd-number fields an enhancement-layer bitstream, or vise versa.

The known temporal scalable coding, however, has several drawbacks.

Base-layer coding causes many prediction errors in motion-compensated inter-picture prediction due to many aliasing components involved in field pictures.

Enhancement-layer coding suffers inaccurate inter-picture prediction due to difference in parity (even/odd) of fields between pictures to be coded and prediction reference pictures.

These two factors drastically lower coding efficiency in the known temporal scalable coding compared to other coding techniques.

SUMMARY OF THE INVENTION

A purpose of the present invention is to provide a moving-picture temporal scalable coding method and a moving-picture temporal scalable coding apparatus that achieve high coding efficiency in coding of interlaced moving-picture video signals, a moving-picture temporal scalable decoding method and a moving-picture temporal scalable decoding apparatus for decoding the video signals coded by the coding method and apparatus, respectively, and also a computer program for performing the coding or the decoding method.

The present invention provides a temporal scalable moving-picture video signal coding method comprising the steps of: converting an input interlaced moving-picture video signal into a progressive moving-picture video signal at the same frame rate as the -interlaced moving-picture video signal; encoding the progressive moving-picture video signal to produce a first bitstream; encoding fields of the interlaced moving-picture video signal, the fields being different in time from frames of the progressive moving-picture video signal, with inter-picture prediction using a locally decoded picture signal as a reference video signal, the locally decoded picture signal being produced by locally decoding the progressive moving-picture video signal, thus producing a second bitstream; and multiplexing the first and second bitstreams into an output temporal scalable moving-picture video bitstream.

Moreover, the present invention provides a temporal scalable moving-picture video signal decoding method comprising the steps of: demultiplexing a bitstream produced by temporal scalable moving-picture coding into a first bitstream and a second bitstream, the first bitstream having been produced by encoding a progressive moving-picture video signal at the same frame rate as an interlaced moving-picture video signal to be reproduced, the second bitstream having been produced by encoding fields of the interlaced moving-picture video signal, the fields being different in time from frames of the progressive moving-picture video signal; decoding the first bitstream to reproduce a progressive moving-picture video signal; converting the reproduced progressive moving-picture video signal into a first field video signal having either even- or odd-number fields of the interlaced moving-picture video signal; decoding the second bitstream with inter-picture prediction using the reproduced progressive moving-picture video signal as a reference video signal, thus producing a second field video signal having fields of the interlaced moving-picture video signal, the fields of the second field video signal being different in parity from the fields of the first field video signal; and switching the first field video signal and the second field video signal to output the interlaced moving-picture video signal.

Furthermore, the present invention provides a temporal scalable moving-picture video signal coding apparatus comprising: a converter to convert an input interlaced moving-picture video signal into a progressive moving-picture video signal at the same frame rate as the interlaced moving-picture video signal; a first bitstream generator to encode the progressive moving-picture video signal, thus generating a first bitstream; a second bitstream generator to encode fields of the interlaced moving-picture video signal, the fields being different in time from frames of the progressive moving-picture video signal, with inter-picture prediction using a locally decoded picture signal as a reference video signal, the locally decoded picture signal being produced by locally decoding the progressive moving-picture video signal, thus producing a second bitstream; and a multiplexer to multiplex the first and second bitstreams into an output temporal scalable moving-picture video bitstream.

Moreover, the present invention provides a temporal scalable moving-picture video signal decoding apparatus comprising: a demultiplexer to demultiplex a bitstream produced by temporal scalable moving-picture coding into a first bitstream and a second bitstream, the first bitstream having been produced by encoding a progressive moving-picture video signal at the same frame rate as an interlaced moving-picture video signal to be reproduced, the second bitstream having been produced by encoding fields of the interlaced moving-picture video signal, the fields being different in time from frames of the progressive moving-picture video signal; a first decoder to decode the first bitstream to reproduce a progressive moving-picture video signal; a converter to convert the reproduced progressive moving-picture video signal into a first field video signal having either even- or odd-number fields of the interlaced moving-picture video signal; a second decoder to decode the second bitstream with inter-picture prediction using the reproduced progressive moving-picture video signal as a reference video signal, thus producing a second field video signal having fields of the interlaced moving-picture video signal, the fields of the second field video signal being different in parity from the fields of the first field video signal; and a switch to switch the first field video signal and the second field video signal to output the interlaced moving-picture video signal.

Furthermore, the present invention provides a computer readable medium encoded with a computer program comprising instruction for a computer-implemented method for temporal scalable moving-picture video signal coding. The method, when executed, causes the computer to execute the steps of: converting an input interlaced moving-picture video signal into a progressive moving-picture video signal at the same frame rate as the interlaced moving-picture video signal; encoding the progressive moving-picture video signal to produce a first bitstream; encoding fields of the interlaced moving-picture video signal, the fields being different in time from frames of the progressive moving-picture video signal, with inter-picture prediction using a locally decoded picture signal as a reference video signal, the locally decoded picture signal being produced by locally decoding the progressive moving-picture video signal, thus producing a second bitstream; and multiplexing the first and second bitstreams into an output temporal scalable moving-picture video bitstream.

Still frirthermore, the present invention provides a computer readable medium encoded with a computer program comprising instruction for a computer-implemented method for temporal scalable moving-picture video signal decoding. The method, when executed, causes the computer to execute the steps of: demultiplexing a bitstream produced by temporal scalable moving-picture coding into a first bitstream and a second bitstream, the first bitstream having been produced by encoding a progressive moving-picture video signal at the same frame rate as an interlaced moving-picture video signal to be reproduced, the second bitstream having been produced by encoding- fields of the interlaced moving-picture video signal, the fields being different in time from frames of the progressive moving-picture video signal; decoding the first bitstream to reproduce a progressive moving-picture video signal; converting the reproduced progressive moving-picture video signal into a first field video signal having either even- or odd-number fields of the interlaced moving-picture video signal; decoding the second bitstream with inter-picture prediction using the reproduced progressive moving-picture video signal as a reference video signal, thus producing a second field video signal having fields of the interlaced moving-picture video signal, the fields of the second field video signal being different in parity from the fields of the first field video signal; and switching the first field video signal and the second, field video signal to output the interlaced moving-picture video signal.

DETAILED DESCRIPTION OF PREFERRED EMBODIMENTS

Several embodiments according to the present invention will be disclosed with reference to the attached drawings.

Figures 1, 2:
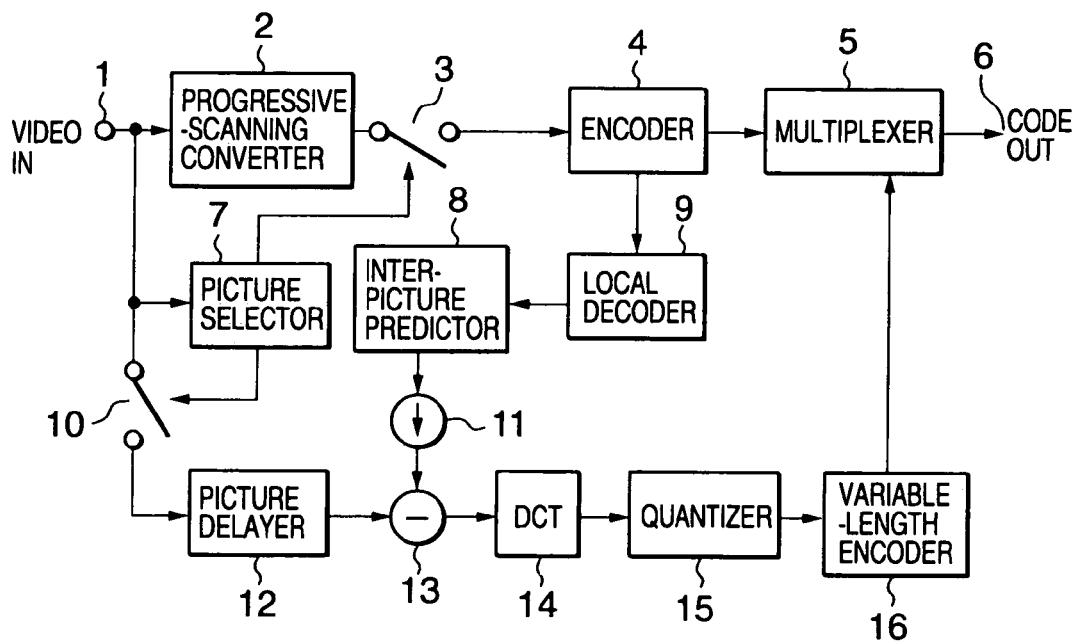
FIG. 1 is an illustration of a moving-picture bitstream under known temporal scalable coding.
FIG. 2 is a block diagram of a first embodiment of a moving-picture temporal scalable coding apparatus according to the present invention.

Shown in FIG. 2 is a first embodiment of a moving-picture temporal scalable coding apparatus according to the present invention.

An input 60-fps (field per second) interlaced moving-picture video signal is supplied, via an input terminal 1, to a progressive-scanning converter 2, a picture selector 7, and a switch 10.

The progressive-scanning converter 2 interpolates scanning lines from scanning lines temporal-spatially adjacent to the former scanning lines, as preprocessing in base-layer coding. The former scanning lines have been decimated from the input interlaced video signal. The interpolation produces a progressive video signal having 60 frames per second with scanning lines two times those of the input interlaced video signal.

The progressive video signal is supplied to a switch 3 via which every second frame is decimated to produce a 30-FPS progressive video signal having 30 frames per second. In the following disclosure, the abbreviation "fps" means "field per second" whereas "FPS" means "frame per second".

The progressive-scanning converter 2 and the switch 3 may work at the same time to obtain the 30-FPS progressive video signal directly from the input interlaced video signal. One requirement is that scanning-line interpolation is performed while the scanning lines of the input video signal remain, to form each progressive frame that exists in the same timing as a field of the input video signal, not an incomplete even- or odd-number filed picture.

The 30-FPS progressive video signal is then supplied to encoder 4. The encoder 4 encodes the video signal and produces a base-layer bitstream (a first bitstream). The base-layer bitstream is supplied to a multiplexer 5 while quantization resultants are supplied to a local decoder 9. The coding technique used in the encoder 4 may be inter-picture predictive coding, intra frame coding under MPEG-2, MPEG-4, etc.

The local decoder 9 performs a coding processing to all frames of the 30-FPS progressive video signal to obtain a 30-FPS- progressive locally reproduced picture to be used as a prediction reference picture. All frames are subjected to local decoding in this embodiment whereas bi-directional predictive frames may not always be subjected to local decoding in MPEG coding.

The 30-FPS progressive locally reproduced picture is supplied to an inter-picture predictor 8 as a prediction reference picture. The predictor 8 produces a progressive prediction signal for each interlaced field interposed between two frames of the 30-FPS progressive video signal.

The progressive prediction signal is supplied to a field decimator 11. The decimator 11 converts the progressive prediction signal into an interlaced prediction signal having fields by decimating scanning lines of the prediction signal. The inter-picture predictor 8 and the field decimator 11 may be combined to obtain the interlaced prediction signal directly from the 30-FPS progressive locally reproduced prediction reference picture.

The switch 10 selects fields from the input 60-fps interlaced moving-picture video signal, different in time from frames selected- by the switch 3, as preprocessing in enhancement-layer coding. Each field to be coded selected by, the switch 10 is supplied to a picture delayer 12. The field to be coded is delayed until a reference picture is produced through the processing from the progressive-scanning converter 2 to the local decoder 9 for inter-picture prediction.

A field video signal is supplied from the picture delayer 12 to a subtracter 13. It is subtracted from the predictive signal supplied from the field decimator 11. The resultant residual is supplied to a DCT 14 for DCT (Discrete Cosine Transform) processing. The resultant DCT coefficients are supplied to a quantizer 15 for quantization at a given step width. The resultant fixed-length coefficients (prediction residual) are supplied to a variable-length encoder 16 for variable-length coding to produce an enhancement-layer bitstream (a second bitstream).

The enhancement-layer bitstream is supplied to the multiplexer 5. Index codes are inserted into the enhancement-layer bitstream and the base-layer bitstream also supplied to the multiplexer 5. The index-code-inserted base-layer and enhancement-layer bitstreams are multiplexed with each other. The multiplexed bitstream is output via a code output terminal 6.

As disclosed above, in this embodiment, an input interlaced moving-picture video signal is converted into a progressive video signal at the same frame rate before coding. In other words, this embodiment performs coding of a progressive moving-picture video signal with no increase in the number of scanning lines. Therefore, this embodiment offers a drastically low bit rate compared to coding of an interlaced moving-picture video signal with no conversion to a progressive video signal.

Figure 3:
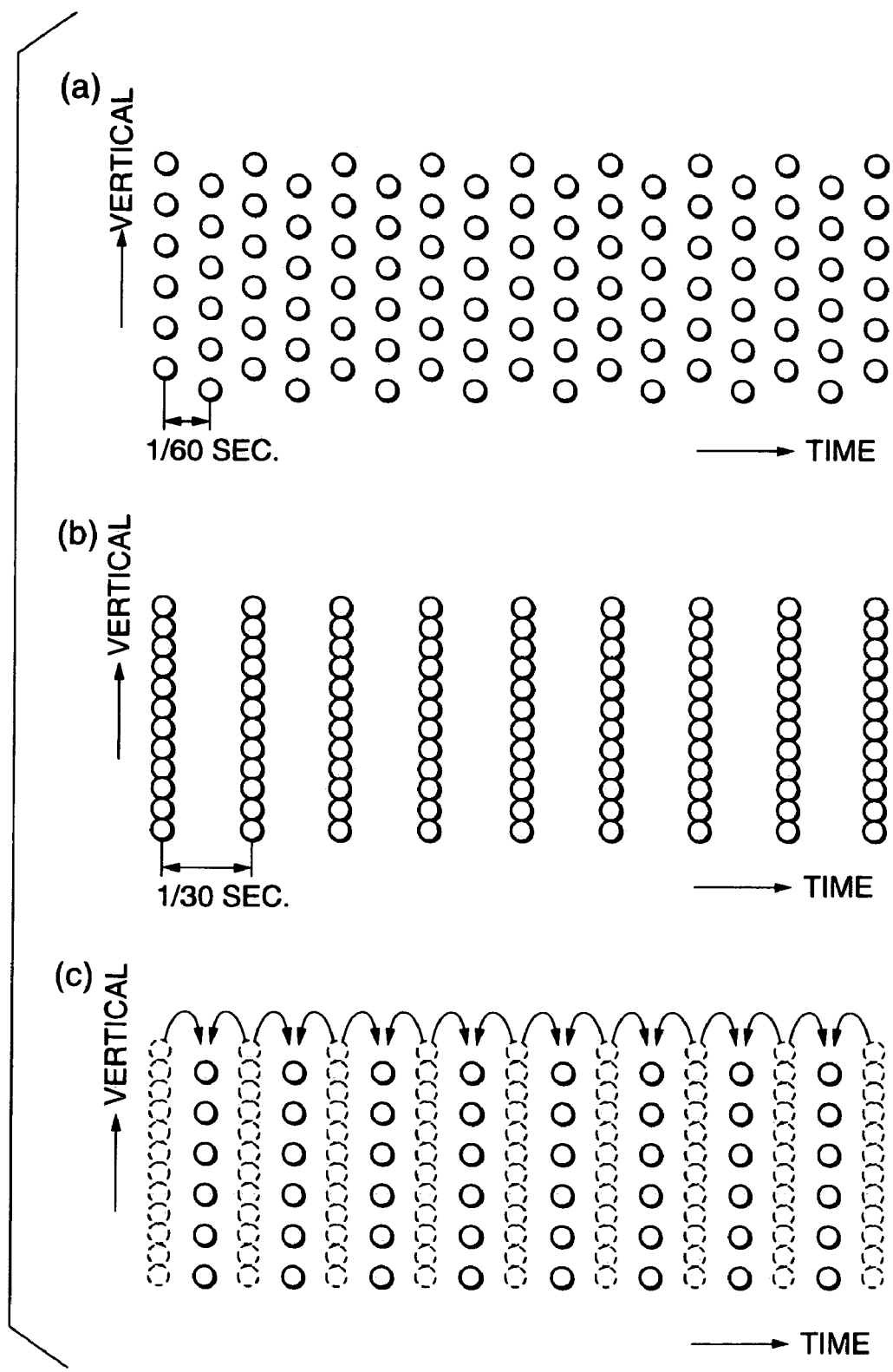
FIG. 3 is an illustration of the structure of scanning lines in an input interlaced moving-picture signal, a base-layer moving-picture signal, and an enhancement-layer moving-picture signal, in the first embodiment of the moving-picture temporal scalable coding apparatus according to the present invention.

Described next with reference to FIG. 3 is the structure of scanning lines in the input interlaced moving-picture signal, the base-layer moving-picture signal, and the enhancement-layer moving-picture signal, in the first embodiment.

Illustrated in (a) of FIG. 3 is the input 60-fps interlaced moving-picture video signal. Scanning lines are displaced in a vertical direction (SVD) from each other between the -even- number and odd-number fields in the time domain (TIME).

The 30-FPS progressive video signal, illustrated in (b) of FIG. 3, to be coded in the base layer has scanning lines at the same timing as the even-number or the odd-number fields of the input 60-fps interlaced moving-picture video signal. This scanning-line structure is suitable for motion compensation with almost no aliasing, thus producing very few prediction errors.

Illustrated in (c) of FIG. 3 is the interlaced video signal in the enhancement layer, having scanning lines of either the even-number or the odd-number fields of the input 60-fps interlaced moving-picture video signal, different in parity from the fields shown in (b) of FIG. 3. The number of scanning lines to be coded in (c) of FIG. 3 is half of those in (a) and (b) of FIG. 3. The interlaced video signal indicated by solid circles is subjected to inter-picture prediction using the progressive video signal indicated by dot circles on both sides of each solid circle with the interval of 1/60 seconds. This inter-picture prediction produces very few prediction errors and a small of amount of codes.

As disclosed in detail, the first embodiment achieves temporal scalable coding superior to the known temporal scalable coding technique and also at higher coding efficiency than the usual interlaced moving-picture coding technique, to an input interlaced moving-picture video signal.

Figure 4:
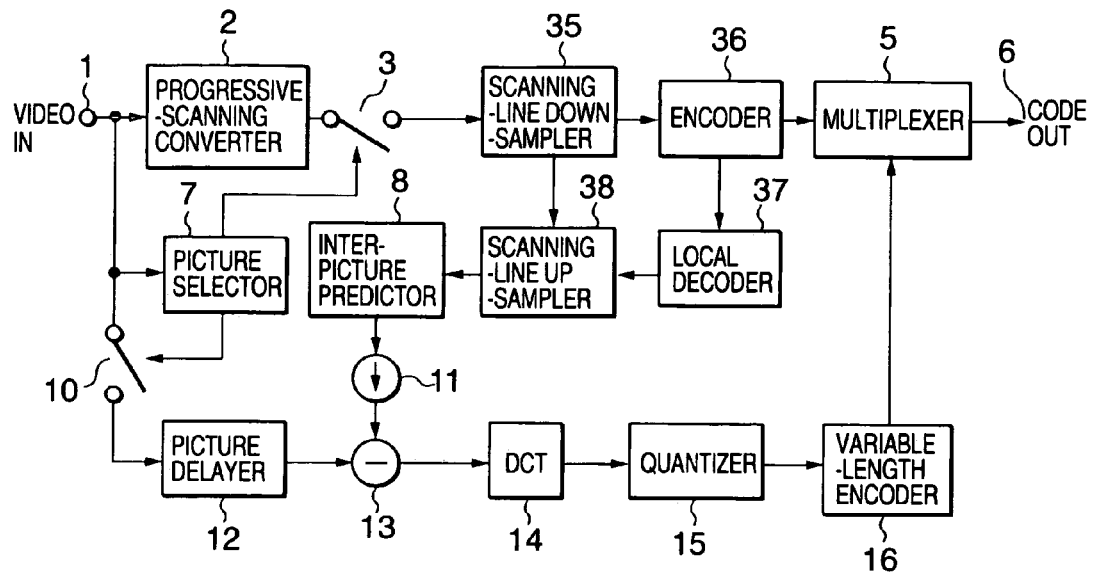
FIG. 4 is a block diagram of a second embodiment of a moving-picture temporal scalable coding apparatus according to the present invention.

Shown in FIG. 4 is a second embodiment of a moving-picture temporal scalable coding apparatus according to the present invention.

In FIG. 4, the elements the same as or analogous to those shown in FIG. 2 are given the same reference numbers and not disclosed in detail.

The temporal scalable coding apparatus shown in FIG. 4 have a scanning-line down-sampler 35 and a scanning-line up-sampler 36 compared to the counterpart in FIG. 2. An encoder 36 and a local decoder 37 shown in FIG. 4 thus operate in different ways from the counterparts 4 and 9 in FIG. 2.

An input 60-fps interlaced moving-picture video signal is supplied, via an input terminal 1, to a progressive-scanning converter 2, a picture selector 7, and a switch 10.

The input 60-fps interlaced moving-picture video signal supplied to the progressive-scanning converter 2 and then to a switch 3 is converted into a 30-FPS progressive video signal, like the first embodiment shown in FIG. 2.

The 30-FPS progressive video signal is supplied to the scanning-line down-sampler 35. It is down-sampled in a spatial vertical direction to about ¾ to ⅔ for its scanning lines while subjected to band limitation by a vertical low-pass filter of the down-sampler 35. Vertical low-pass filtering is performed to produce no aliasing after down-sampling. The number of scanning lines is reduced to 360 or 320 when the number of effective scanning lines per frame is 480 for the input 60-fps interlaced moving-picture video signal. Or, the former is reduced to 810 or 720 when the latter is 1080. The input interlaced video signal has been suppressed for its highest frame vertical frequency components for reducing flickers. Therefore, the video signal converted into a progressive signal by the progressive-scanning converter 2 has few highest frame vertical frequency components, thus a very little video information being lost by down-sampling.

The 30-FPS video signal down-sampled in the spatial vertical direction is then coded by the encoder 36. The signal supplied to the encoder 36 has the fewer number of scanning lines than that to the counterpart 4 (FIG. 2). Thus, the amount of processing performed and also the amount of codes of a base-layer bitstream (a third bitstream) generated by the encoder 36 are smaller than those by the counterpart 4 by which all pictures are coded after converted into progressive pictures.

The 30-FPS video signal coded by the encoder 36 is supplied to the local decoder 37 for local decoding of all frames of the video signal. The signal supplied to the local decoder 37 has the fewer number of scanning lines than that to the counterpart 9 (FIG. 2). Thus, the amount of processing performed by the local decoder 37 is also smaller than the counterpart 9.

A locally decoded signal output from the local decoder 37 is supplied to the scanning up-sampler 38 for increase in the scanning line to the original number before down-sampling.

The up-sampled signal is supplied to an inter-picture predictor 8 and a field decimator 11 for the same processing as the counterparts 8 and 11 (FIG. 2).

The switch 10 selects fields from the input 60-fps interlaced moving-picture video signal, different in time from frames selected by the switch 3, as preprocessing in enhancement-layer coding.

The video signal having the fields as selected above is supplied to a picture delayer 12, a subtracter 13, a DCT 14, a quantizer 15, and a variable-length encoder 16, for production of an enhancement-layer bitstream (a second bitstream), like the counterparts 12, 13, 14, 15 and 16 in FIG. 2.

The enhancement-layer bitstream is supplied to a multiplexer 5 for multiplexing this bitstream and the base-layer bitstream from the encoder 36. The multiplexed bitstream is little bit different from that of the multiplexer 5 (FIG. 2), due to down-sampling and up-sampling.

The scanning up-sampler 38 and the field decimator 11 may be combined to directly produce the field video signal that is produced through the local decoder 37 to the decimator 11 in FIG. 4. Nevertheless, the processing through the local decoder 37 to the decimator 11 in FIG. 4 is appropriate for, for example, half-pixel motion compensation which requires pictures of double density in the vertical direction.

Disclosed next are embodiments of moving-picture temporal scalable decoding apparatus according to the present invention.

Figure 5:
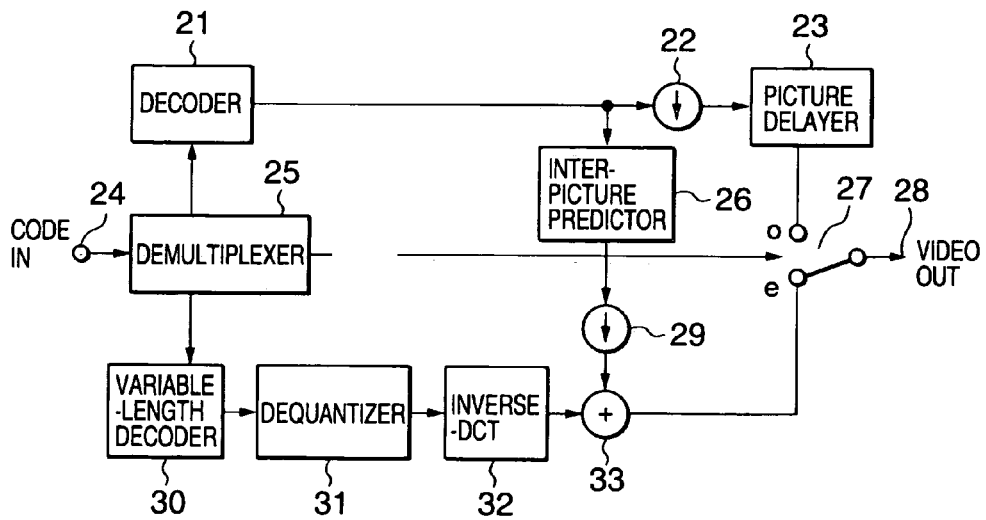
FIG. 5 is a block diagram of a first embodiment of a moving-picture temporal scalable decoding apparatus according to the present invention.

Shown in FIG. 5 is a first embodiment of a moving-picture temporal scalable decoding apparatus according to the present invention, which is compatible with the moving-picture temporal scalable coding apparatus shown in FIG. 2.

In FIG. 5, a moving-picture bitstream supplied to a demultiplexer 25 via a code input terminal 24 from, for example, the code output terminal 6 shown in FIG. 2, is divided into a base-layer bitstream (a first bitstream), an enhancement-layer bitstream (a second bitstream).

The base-layer bitstream is supplied to a decoder 21 to be reproduced into a 30-FPS progressive video signal. The decoder 21 performs processing, an inverse version of the encoding processing by the encoder 4 shown in FIG. 2.

The reproduced signal is supplied to a field decimator 22 and an inter-picture predictor 26. The field decimator 22 decimates the interpolated scanning lines from the reproduced signal to obtain a field signal. The field signal is supplied to a picture delayer 23 and stored therein for several fields to be synchronized with fields of the enhancement-layer bitstream.

The enhancement-layer bitstream is supplied to a variable-length decoder 30 so that variable-length codes of prediction residual is reconverted into fixed-length codes.

The fixed-length codes are supplied to a dequantizer 31 for dequantization at a given quantization parameter, thus reproduced into DCT coefficients of prediction residual.

The DCT coefficients are supplied to an inverse DCT 32 so that 8×8 DCT coefficients are converted into a decoded prediction-residual signal.

The decoded prediction-residual signal is supplied to an adder 33. Also supplied to the adder 33 is a prediction signal from the inter-picture predictor 26. The decoded prediction-residual signal and the prediction signal are added to each other to be a 30-fps decoded video signal, such as, shown in FIG. 3C, having either even-number or odd-number fields of a 60-fps interlaced moving-picture video signal.

The output video signal from the picture delayer 23 and the decoded video signal from the adder 33 are selectively output via a switch 27 and an output terminal 28 in synchronism with the scale factor supplied by the demultiplexer 25 in accordance with a parity of fields. The selectively output signal is a 60-fps interlaced moving-picture video signal.

Figures 6, 7, 8:
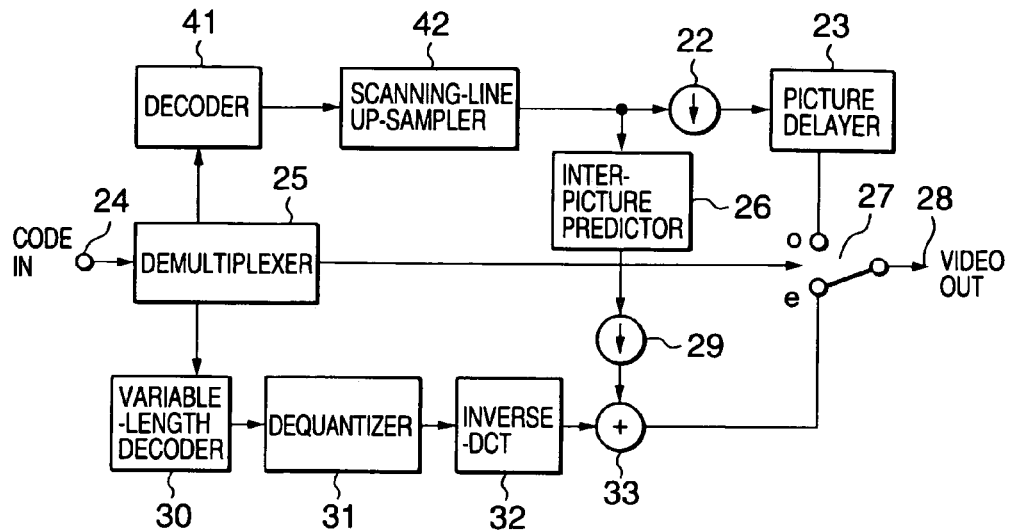
FIG. 6 is a block diagram of a second embodiment of a moving-picture temporal scalable decoding apparatus according to the present invention.
FIG. 7 is an illustration of the structure of a moving-picture temporal scalable bitstream produced by the first embodiment of the moving-picture temporal scalable coding apparatus according to the present invention.
FIG. 8 is an illustration of the structure of a moving-picture temporal scalable bitstream produced by the second embodiment of the moving-picture temporal scalable coding apparatus according to the present invention.

Shown in FIG. 6 is a second embodiment of a moving-picture temporal scalable decoding apparatus according to the present invention, which is compatible with the moving-picture temporal scalable coding apparatus shown in FIG. 4.

Elements shown in FIG. 6 the same as or analogous to those shown in FIG. 5 are given the same reference numerals and not explained in detail.

The differences between the second embodiment in FIG. 6 from the first embodiment in FIG. 5 are that the former has a scanning up-sampler 42 and a decoder 41.

In FIG. 6, a moving-picture bitstream supplied to a demultiplexer 25 via a code input terminal 24 from, for example, the code output terminal 6 shown in FIG. 4, is divided into a base-layer bitstream (a third bitstream), an enhancement-layer bitstream (a second bitstream).

The base-layer bitstream is supplied to the decoder 41 to reproduce a 30-FPS progressive video signal. The decoder 41 operates in the same way as the counterpart 21 shown in FIG. 5. The amount of processing by the decoder 41 is, however, smaller than that by the counterpart 21, due to fewer number of scanning lines caused by down-sampling and up-sampling performed in coding, such as, shown in FIG. 4.

A reproduced video signal is supplied from the decoder 41 to the scanning line up-sampler 42 so that the number of scanning lines of the reproduced video signal is returned to the original number before down-sampling in coding (FIG. 4).

The up-sampled video signal is then supplied to a field decimator 22 and an inter-picture predictor 26.

The scanning line up-sampler 42 is the same as the counterpart 38 shown in FIG. 4 in operation. The field decimator 22, a picture delayer 23, a switch 27, the inter-picture predictor 26, and another field decimator 29 are the same as the counterparts shown in FIG. 5 in operation.

The enhancement-layer bitstream is subjected to decoding by a variable-length decoder 30, a dequantizer 31, an inverse DCT 32, an adder 33, the inter-picture predictor 26, and the field decimator 29, the same as the counterparts shown in FIG. 5 in operation.

The resultant signal is a 30-fps decoded video signal having either even-number or odd-number fields of a 60-fps interlaced moving-picture video signal. It is then supplied from the adder 33 to the switch 27 for selective video-signal output.

Discussed next with reference to FIGS. 7 and 8 is the structure of moving-picture temporal scalable bitstreams according to the present invention.

An exemplary moving-picture temporal scalable bitstream structure according to the present invention consists of base-layer bitstreams to which a 30-FPS progressive video signal is coded and enhancement-layer bitstreams to which even-number or odd-number fields of a 60-fps interlaced moving-picture video signal are coded.

Such a bitstream structure is illustrated in FIG. 7 in which the signs "Prog." and "field" indicate one frame of a progressive video signal and one field of an interlaced moving-picture video signal, respectively, with- numerals indicating the order of input pictures.

Base-layer pictures (1-frame progressive signal) come before enhancement-layer pictures (1-field interlaced video signal) for bi-directional prediction of the enhancement-layer pictures, even though the former pictures come after the latter pictures in the time domain. The reverse order is further required among the base-layer pictures when bi-directional prediction is performed for these pictures.

Illustrated in FIG. 7 is multiplexing per field in which progressive base-layer bitstreams each for one frame and interlaced enhancement-layer bitstreams each for one field appear alternately. These bitstreams may, however, not always appear alternately per picture. In other words, these bitsteams may be put in different packets and multiplexed on a timely basis.

Another exemplary moving-picture temporal scalable bitstream structure according to the present invention is illustrated in FIG. 8 in which base-layer bitstreams ("Frog.") are transmitted before enhancement-layer bitstreams ("field") for multiplexing.

In this invention, base-layer bitstreams of a coded 30-FPS progressive video signal and enhancement-layer bitstreams of coded even-number or odd-number fields of a 60-fps interlaced moving-picture video signal can be stored in a storage medium per packet with index information indicating the base or the enhancement layer.

It is enough for such a storage medium that the base-layer bitstreams can only be reproduced. The reproduction of the base-layer bitstreams only according to the present invention offers higher resolution than the known temporal scalable coding technique. This is because the base-layer bitstreams carry progressing video signal in this invention whereas those carry either the even- or odd-number of fields of an interlaced moving-picture video signal in the known coding technique.

The present invention further offers computer programs for achieving the function of the first (second) embodiment of the moving-picture temporal scalable coding apparatus and/or the first (second) embodiment of the moving-picture temporal scalable decoding apparatus, disclosed above.

Figure 9:
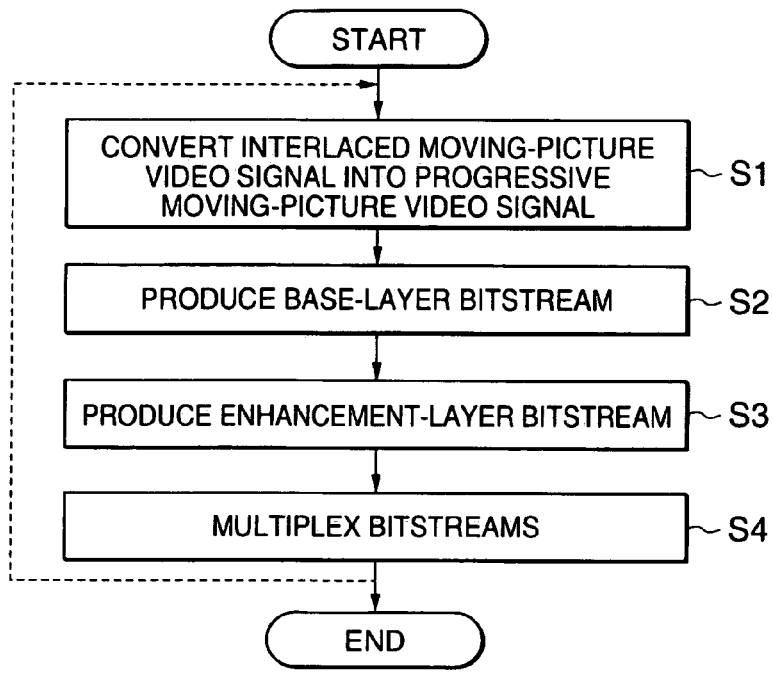
FIG. 9 is a flowchart indicating a sequence of a computer program for moving-picture temporal scalable coding according to the present invention.

Disclosed first with respect to a flowchart shown in FIG. 9 is a computer program for moving-picture temporal scalable coding.

Firstly, an interlaced moving-picture video signal supplied to a computer is converted into a progressive moving-picture video signal at the same frame rate (step S1). The processing in step S1 corresponds to the operations of, for example, the progressive-scanning converter 2, the switch 3, and the picture selector 7 of the moving-picture temporal scalable coding apparatus shown in FIG. 2.

The progressive moving-picture video signal converted in step S1 is coded to produce a base-layer bitstream (a first-bitstream) (step S2) while it is further locally decoded to produce a locally reproduced video signal. The processing in step S2 corresponds to the operations of, for example, the encoder 4 and the local decoder 9 of the moving-picture temporal scalable coding apparatus shown in FIG. 2.

Fields of the input interlaced moving-picture video signal, different in time from frames of the progressive moving-picture video signal are coded with inter-picture prediction using the locally reproduced video signal as a reference video signal to produce an enhancement-layer bitstream (a second bitstream) (step S3). The processing in step S2 corresponds to the operations of, for example, the inter-picture predictor 8, the switch 10, the field decimator 11, the picture delayer 12, the subtracter 13, the DCT 14, the quantizer 15, and the variable-length encoder 16 of the moving-picture temporal scalable coding apparatus shown in FIG. 2.

The base-layer and enhancement-layer bitstreams are multiplexed with each other as an output temporal scalable coded moving-picture video signal (step S4). The processing in step S4 corresponds to the operation of, for example, the multiplexer 5 of the moving-picture temporal scalable coding apparatus shown in FIG. 2.

In step S2, the progressive moving-picture video signal may be down-sampled in the spatial vertical direction at the same frame rate as the input interlaced moving-picture video signal before coded into the base-layer bitstream (as a third bitstream), as disclosed for the moving-picture temporal scalable coding apparatus shown in FIG. 4.

Figure 10:
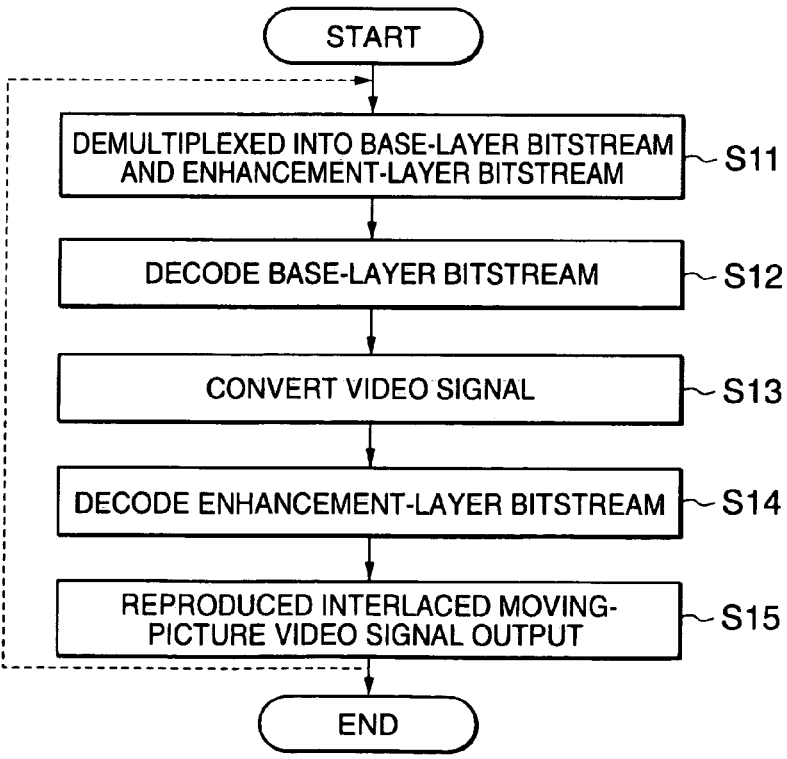
FIG. 10 is a flowchart indicating a sequence of a computer program for moving-picture temporal scalable decoding according to the present invention.

Disclosed next with respect to a flowchart shown in FIG. 10 is a computer program for moving-picture temporal scalable decoding.

Firstly, the temporal scalable coded moving-picture video signal output in step S4 of FIG. 9 is supplied to a computer and divided into the base-layer bitstream (the first bitstream) and the enhancement-layer bitstream (the second bitstream) (step S11). The processing in step S11 corresponds to the operation of, for example, the demultiplexer 25 of the moving-picture temporal scalable decoding apparatus shown in FIG. 5.

The base-layer bitstream is decoded into a progressive moving-picture video signal (step S12). The processing in step S12 corresponds to the operation of, for example, the decoder 21 of the moving-picture temporal scalable decoding apparatus shown in FIG. 5.

The reproduced progressive moving-picture video signal is converted into a first field video signal having even-number (or odd-number) fields of an interlaced moving-picture video signal to be reproduced (step S13). The processing in step S13 corresponds to the operations of, for. example, the field decimator 22 and the picture delayer 23 of the moving-picture temporal scalable decoding apparatus shown in FIG. 5.

The enhancement-layer bitstream is subjected to inter-picture prediction using the reproduced progressive moving-picture video signal as a reference picture signal, to be reproduced into a second field video signal having odd-number (or even-number) fields of the interlaced moving-picture video signal to be reproduced, different in parity from the fields of the first field video signal (step S14). The processing in step S14 corresponds to the operations of, for example, the variable-length decoder 30, the dequantizer 31, the inverse-DCT 32, the adder 33, the inter-picture predictor 26, and the field decimator 29 of the moving-picture temporal scalable decoding apparatus shown in FIG. 5.

The first field video signal and the second field video signal are switched and output as the reproduced interlaced moving-picture video signal (step S15). The processing in step S15 corresponds to the operations of, for example, the switch 27 of the moving-picture temporal scalable-decoding apparatus shown in FIG. 5.

In step S12, the decoded progressive moving-picture video signal may be up-sampled in the spatial vertical direction at the same frame rate as the interlaced moving-picture video signal to be reproduced when the base-layer bitstream (the third bitstream) carries the down-sampled progressive moving-picture video signal, as disclosed for the moving-picture temporal scalable decoding apparatus shown in FIG. 6.

In addition to the above embodiments, the present invention is applicable, for example, to a transmitter for transmitting a temporal scalable coded moving-picture video signal and a receiver for receiving the transmitted video signal.

Figure 11:
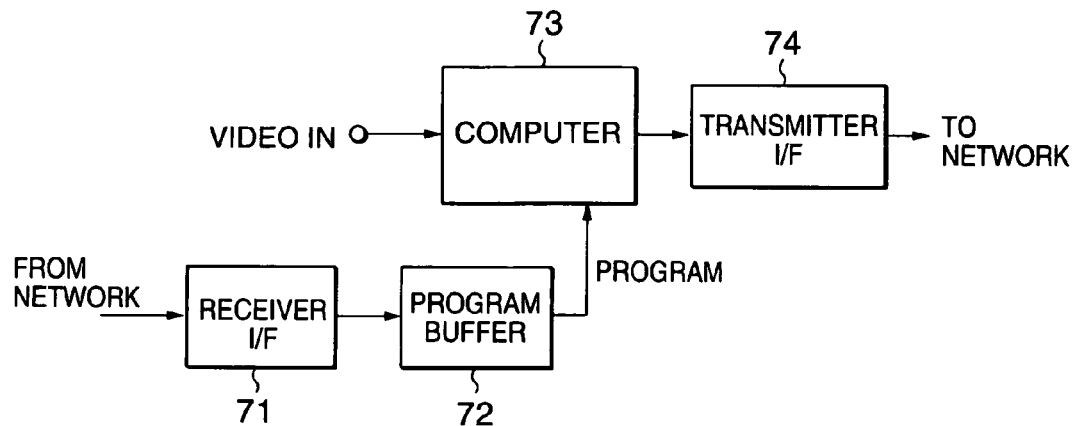
FIG. 11 is a block diagram of an embodiment of a transmitter for transmitting a temporal scalable coded moving-picture video signal according to the present invention.

Shown in FIG. 11 is a block diagram of an embodiment of a transmitter for transmitting a temporal scalable coded moving-picture video signal.

The computer program disclosed with reference to FIG. 9 is transmitted, over a network (not shown), to a receiver interface (I/F) 71. The computer program is decoded and stored in a program buffer 72.

An interlaced moving-picture video signal is supplied to a computer 73. The input video signal is subjected to the coding processing in accordance with the flowchart shown in FIG. 9 under the computer program supplied from the program buffer 72.

Figure 12:
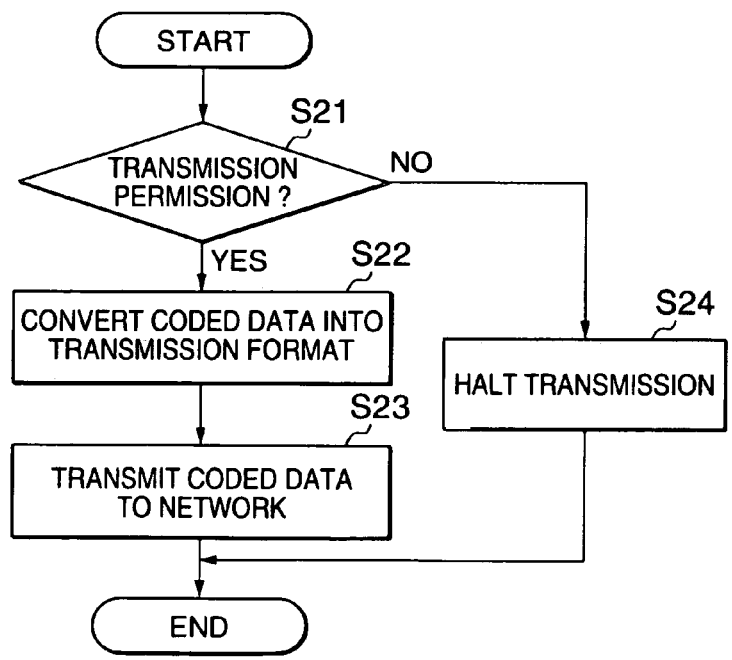
FIG. 12 is a flowchart indicating an operation of a transmitter interface installed in the transmitter shown in FIG. 11.

The resultant coded data is supplied to a transmitter interface (I/F) 74. The coded data is transmitted to the network in accordance with a flowchart shown in FIG. 12.

In detail, the transmitter I/F 74 communicates with a recipient terminal over the network under a given protocol and determines whether there is transmission permission from the terminal (step S21).

If positive (YES in step S21), the transmitter I/F 74 converts the coded data into a given transmission format (step S22) and transmits it to the network (step S23). On the contrary, if negative (NO in step 521), the transmitter I/F 74 halts transmission of the coded data (step S24).

In addition to the coded data, the transmitter I/F 74 may transmit the computer program for decoding the coded data in accordance with the flowchart shown in FIG. 10 so that a computer of the recipient terminal can decode the coded data under the computer program.

Figure 13:
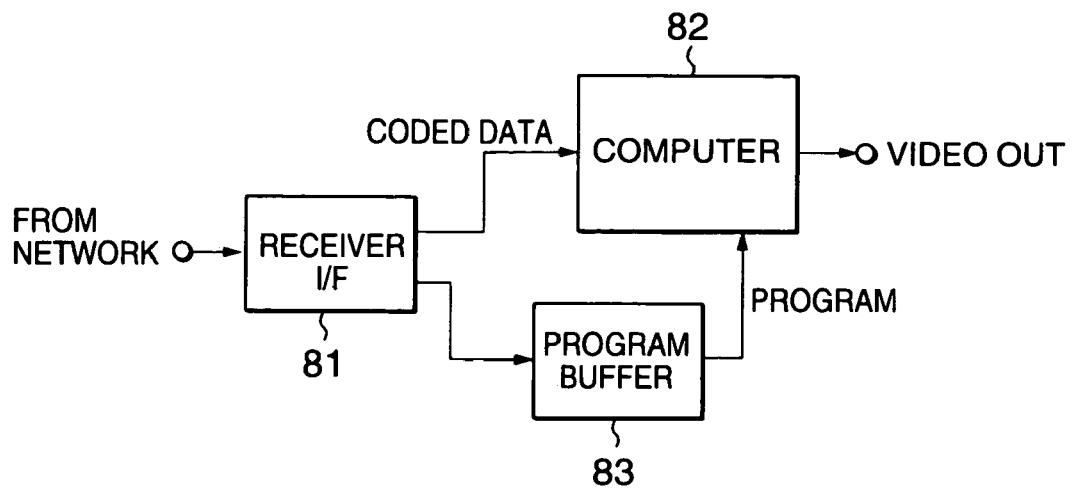
FIG. 13 is a block diagram of an embodiment of a receiver for receiving a temporal scalable coded moving-picture video signal according to the present invention.

Shown in FIG. 13 is a block diagram of an embodiment of a receiver for receiving a temporal scalable coded moving-picture video signal.

The following disclosure is made under the condition that coded data of a temporal scalable coded moving-picture video signal and the computer program for decoding the coded data in accordance with the flowchart shown in FIG. 10 are transmitted over a network.

Figure 14:
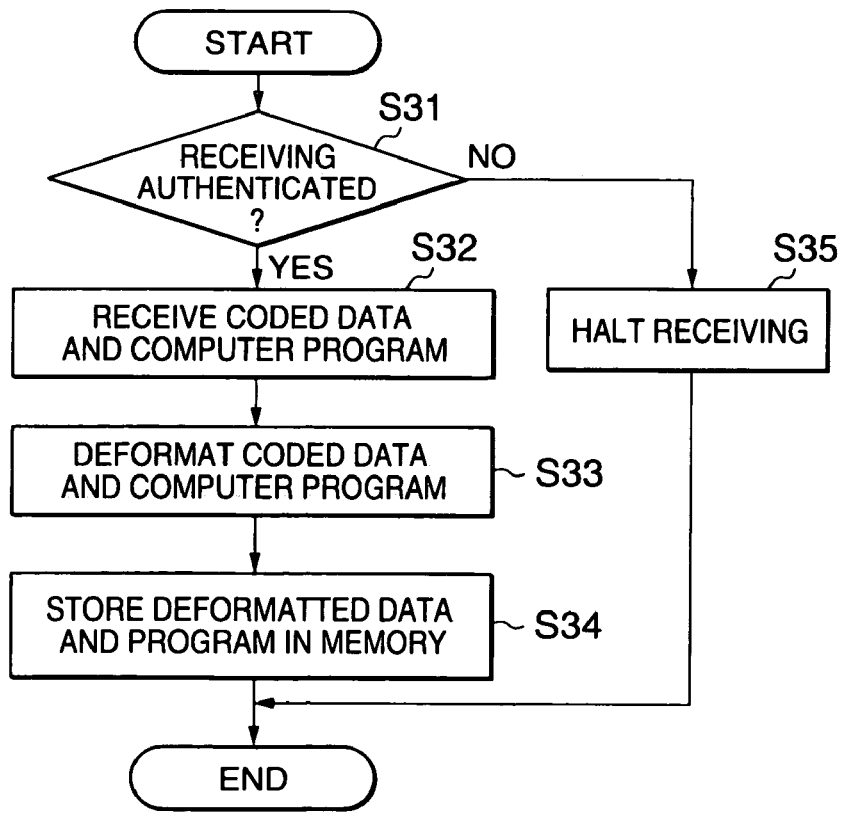
FIG. 14 is a flowchart indicating an operation of a receiver interface installed in the receiver shown in FIG. 13.

A receiver interface (I/F) 81 is connected to a network (not shown) and operates in accordance with a flowchart shown in FIG. 14.

In detail, the receiver I/F 81 determines whether a signal transmitted over the network has been authenticated to be received (step S31).

If positive (YES in step S31), the receiver I/F 81 receives and decodes the coded data and the computer program (step S32). The receiver I/F 81 deformats the coded data and the computer program (step S33) and stores them in its memory (step S34).

On the contrary, if negative (NO in step S31), the receiver I/F 81 halts receiving the coded data and the computer program (step S35).

The coded data stored in the memory of the receiver I/F 81 is supplied to a computer 82. The computer program also stored in the memory of the receiver I/F 81 is once stored in a program buffer 83 and then supplied to the computer 82.

The computer 82 decodes the coded data under the computer program in accordance with the flowchart shown in FIG. 10, to reproduce an interlaced moving-picture video signal.

The computer programs are supplied over the network in FIGS. 11 and 13. Not only that, however, the computer programs may be reproduced from storage media.

As disclosed in detail, the present invention has several advantages. Some of these are as follows:

(1) Encoding an input interlaced moving-picture video signal after converting it into a progressive moving-picture video signal at the same frame rate as the interlaced moving-picture video signal, or encoding the progressive moving-picture video signal with the same number of scanning lines as the interlaced moving-picture video signal, drastically reduces the bit rate compared to encoding the input interlaced moving-picture video signal itself, in production of a base-layer bitstream (a first bitstream).

(2) Inter-picture prediction in producing an enhancement-layer bitstream (a second bitstream) using anterior and posterior reference progressive pictures both very close to a target picture to be predicted in the time domain, as illustrated in (c) of FIG. 3, achieves extremely high coding efficiency with a small amount of codes generated, which thus achieves temporal scalable coding to the input interlaced moving-picture signal at high coding efficiency. This temporal scalable coding is superior to the known temporal scalable coding technique and also to the usual interlaced moving-picture coding on coding efficiency.

(3) The amount of coding processing with conversion of an interlaced moving-picture video signal into a progressive moving-picture video signal at the same frame rate in this invention is larger than the known temporal scalable coding technique. Nevertheless, it is less than encoding interlaced moving-picture video signals after converting all of them into progressive signals.

(4) Production of a base-layer bitstream (a third bitstream) with encoding a progressive moving picture video signal having less scanning lines by down-sampling in the spatial vertical direction generates a smaller amount of codes than production of the same from a progressive moving-picture video signal with no down-sampling. The input interlaced moving-picture video signal, to be converted into the progressive moving-picture video signal, has been suppressed for its vertical-frequency components to be subjected to down-sampling to reduce scanning lines, thus almost no decrease in resolution.

(5) Decoding and up-sampling the base-layer bitstream (the third bitstream) produced by encoding the progressive moving-picture video signal down-sampled in the spatial vertical direction at the same frame rate as an interlaced moving-picture signal to be reproduced, achieves smaller amount of decoding processing than decoding a bitstream of a progressive moving-picture video signal with no down-sampling.

What is claimed is:

1. A temporal scalable moving-picture video signal coding method comprising the steps of:

converting an input interlaced moving-picture video signal carrying first and second alternate fields into a progressive moving-picture video signal at the same frame rate per second as the interlaced moving-picture video signal, the progressive moving-picture video signal having scanning lines at the same timing as scanning lines of the first fields of the interlaced moving-picture video signal;

encoding the progressive moving-picture video signal to produce a first progressive bitstream;

encoding the second fields of the interlaced moving-picture video signal, the second fields being different in time from frames of the progressive moving-picture video signal, with inter-picture prediction using a locally decoded picture signal as a reference video signal, the locally decoded picture signal being produced by locally decoding the progressive moving-picture video signal, the second fields having scanning lines half of scanning lines of the progressive moving-picture video signal, thus producing a second bitstream; and multiplexing the first and second bitstreams into an output temporal scalable moving-picture video bitstream.

2. A temporal scalable moving-picture video signal decoding method comprising the steps of:

demultiplexing a bitstream produced by temporal scalable moving-picture coding into a first bitstream and a second bitstream, the first bitstream having been produced by encoding a progressive moving-picture video signal at the same frame rate per second as an interlaced moving-picture video signal carrying first and second alternate fields and to be reproduced, the progressive moving-picture video signal having scanning lines at the same timing as scanning lines of the first fields of the interlaced moving-picture video signal, the second bitstream having been produced by encoding the second fields of the interlaced moving-picture video signal, the second fields being different in time from frames of the progressive moving-picture video signal and having scanning lines half of scanning lines of the progressive moving-picture video signal;

decoding the first bitstream to reproduce a progressive moving-picture video signal;

converting the reproduced progressive moving-picture video signal into a first field video signal having either even- or odd-number fields of the interlaced moving-picture video signal;

decoding the second bitstream with inter-picture prediction using the reproduced progressive moving-picture video signal as a reference video signal, thus producing a second field video signal having fields of the interlaced moving-picture video signal, the fields of the second field video signal being different in parity from the fields of the first field video signal; and switching the first field video signal and the second field video signal to output the interlaced moving-picture video signal.

3. A temporal scalable moving-picture video signal coding apparatus comprising:

a converter to convert an input interlaced moving-picture video signal carrying first and second alternate fields into a progressive moving-picture video signal at the same frame rate per second as the interlaced moving-picture video signal, the progressive moving-picture video signal having scanning lines at the same timing as scanning lines of the first fields of the interlaced moving-picture video signal;

a first bitstream generator to encode the progressive moving-picture video signal, thus generating a first bitstream;

a second bitstream generator to encode the second fields of the interlaced moving-picture video signal, the second fields being different in time from frames of the progressive moving-picture video signal, with inter-picture prediction using a locally decoded picture signal as a reference video signal, the locally decoded picture signal being produced by locally decoding the progressive moving-picture video signal, the second fields having scanning lines half of scanning lines of the progressive moving-picture video signal, thus producing a second bitstream; and a multiplexer to multiplex the first and second bitstreams into an output temporal scalable moving-picture video bitstream.

4. The temporal scalable moving-picture video signal coding apparatus according to claim 3 further comprising a scanning-line down-sampler to which the progressive moving-picture video signal obtained by the converter is supplied, the down-sampler down-sampling the progressive moving-picture video signal in a spatial vertical direction to produce a progressive moving-picture video signal having a smaller number of scanning lines than the progressive moving-picture video signal obtained by the converter, wherein the progressive moving-picture video signal having the smaller number of scanning lines is supplied to the first bitstream generator, thus a third bitstream having the smaller number of scanning lines being generated, and the second bitstream generator has a scanning-line up-sampler to up-sample a locally decoded video signal in the spatial vertical direction, the locally decoded video signal being obtained by locally decoding the third bitstream to produce a video signal having the same number of scanning lines as the progressive moving-picture video signal supplied to the down-sampler, the produced video signal being uses as the reference video signal.

5. A temporal scalable moving-picture video signal decoding apparatus:

a demultiplexer to demultiplex a bitstream produced by temporal scalable moving-picture coding into a first bitstream and a second bitstream, the first bitstream having been produced by encoding a progressive moving-picture video signal at the same frame rate per second as an interlaced moving-picture video signal carrying first and second alternate fields and to be reproduced, the progressive moving-picture video signal having scanning lines at the same timing as scanning lines of the first fields of the interlaced moving-picture video signal, the second bitstream having been produced by encoding the second fields of the interlaced moving-picture video signal, the second fields being different in time from frames of the progressive moving-picture video signal and having scanning lines half of scanning lines of the progressive moving-picture video signal;

a first decoder to decode the first bitstream to reproduce a progressive moving-picture video signal;

a converter to convert the reproduced progressive moving-picture video signal into a first field video signal having either even- or odd-number fields of the interlaced moving-picture video signal;

a second decoder to decode the second bitstream with inter-picture prediction using the reproduced progressive moving-picture video signal as a reference video signal, thus producing a second field video signal having fields of the interlaced moving-picture video signal, the fields of the second field video signal being different in parity from the fields of the first field video signal; and a switch to switch the first field video signal and the second field video signal to output the interlaced moving-picture video signal.

6. The temporal scalable moving-picture video signal decoding apparatus according to claim 5, wherein the demultiplexer demultiplex the bitstream produced by temporal scalable moving-picture coding into the second bitstream and a third bitstream produced by encoding a progressive moving-picture video signal down-sampled in a spatial vertical direction at the same frame rate as the interlaced moving-picture video signal to be reproduced, the first decoder decoding the third bitstream into the down-sampled progressive moving-picture video signal and up-sampling the down-sampled and decoded progressive moving-picture video signal in the spatial vertical direction, and the converter converting the up-sampled progressive moving-picture video signal into the first field video signal.

7. A computer readable medium encoded with a computer program comprising instruction for a computer-implemented method for temporal scalable moving-picture video signal coding, when executed, said method causing the computer to execute the steps of:

converting an input interlaced moving-picture video signal carrying first and second alternate fields into a progressive moving-picture video signal at the same frame rate per second as the interlaced moving-picture video signal, the progressive moving-picture video signal having scanning lines at the same timing as scanning lines of the first fields of the interlaced moving-picture video signal;

encoding the progressive moving-picture video signal to produce a first bitstream;

encoding the second fields of the interlaced moving-picture video signal, the second fields being different in time from frames of the progressive moving-picture video signal, with inter-picture prediction using a locally decoded picture signal as a reference video signal, the locally decoded picture signal being produced by locally decoding the progressive moving-picture video signal, the second fields having scanning lines half of scanning lines of the progressive moving-picture video signal, thus producing a second bitstream; and multiplexing the first and second bitstreams into an output temporal scalable moving-picture video bitstream.

8. A computer readable medium encoded with a computer program comprising instruction for a computer-implemented method for temporal scalable moving-picture video signal decoding, when executed, said method causing the computer to execute the steps of:

demultiplexing a bitstream produced by temporal scalable moving-picture coding into a first bitstream and a second bitstream, the first bitstream having been produced by encoding a progressive moving-picture video signal at the same frame rate per second as an interlaced moving-picture video signal carrying first and second alternate fields and to be reproduced, the progressive moving-picture video signal having scanning lines at the same timing as scanning lines of the first fields of the interlaced moving-picture video signal, the second bitstream having been produced by encoding the second fields of the interlaced moving-picture video signal, the second fields being different in time from frames of the progressive moving-picture video signal and having scanning lines half of scanning lines of the progressive moving-picture video signal;

decoding the first bitstream to reproduce a progressive moving-picture video signal;

converting the reproduced progressive moving-picture video signal into a first field video signal having either even-or odd-number fields of the interlaced moving-picture video signal;

decoding the second bitstream with inter-picture prediction using the reproduced progressive moving-picture video signal as a reference video signal, thus producing a second field video signal having fields different in parity from the fields of the first field video signal; and switching the first field video signal and the second field video signal to output the interlaced moving-picture video signal.

* * * * *